US012777348B2

(12) United States Patent
Wang et al.

(10) Patent No.: US 12,777,348 B2
(45) Date of Patent: Oct. 27, 2026

(54) METHOD AND APPARATUS FOR DETERMINING MEASUREMENT GAP, AND TERMINAL DEVICE

(71) Applicant: GUANGDONG OPPO MOBILE TELECOMMUNICATIONS CORP., LTD., Dongguan (CN)

(72) Inventors: Shukun Wang, Dongguan (CN); Rongyi Hu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 700 days.

(21) Appl. No.: 18/208,426

(22) Filed: Jun. 12, 2023

(65) Prior Publication Data

US 2023/0319613 A1 Oct. 5, 2023

Related U.S. Application Data

(63) Continuation of application No. PCT/CN2021/078523, filed on Mar. 1, 2021.

(51) Int. Cl.
*H04W 72/0453* (2023.01)
*H04W 24/08* (2009.01)

(52) U.S. Cl.
CPC ....... *H04W 24/08* (2013.01); *H04W 72/0453* (2013.01)

(58) Field of Classification Search
None
See application file for complete search history.

(56) References Cited

U.S. PATENT DOCUMENTS

2018/0295600 A1* 10/2018 Kumar .................. H04L 5/0051
2018/0324619 A1* 11/2018 Harada ................. H04W 24/10
2019/0182000 A1* 6/2019 Futaki .................. H04L 5/0092
(Continued)

FOREIGN PATENT DOCUMENTS

CN 111432478 A 7/2020
CN 111526584 A 8/2020
(Continued)

OTHER PUBLICATIONS

First Office Action of the Chinese application No. 202180074575.6, issued on Jan. 20, 2025, 18 pages with English translation.
(Continued)

*Primary Examiner* — The Hy Nguyen
(74) *Attorney, Agent, or Firm* — BAYES PLLC

(57) ABSTRACT

A method and apparatus for determining a measurement gap, and a non-transitory computer-readable storage medium are provided. The method comprises: determining, by a terminal device, that switching from a BWP to a target BWP is triggered, switching of the source BWP being associated with a first measurement gap configuration, and the target BWP being associated with a second measurement gap configuration; and determining, by the terminal device, an activated or enabled measurement gap configuration from the first measurement gap configuration and the second measurement gap configuration, and performing measurement using the activated or enabled measurement gap configuration.

14 Claims, 7 Drawing Sheets

(56) References Cited

U.S. PATENT DOCUMENTS

| | | | |
|---|---|---|---|
| 2019/0239106 A1 | 8/2019 | Cui et al. | |
| 2019/0373496 A1 | 12/2019 | Cui et al. | |
| 2020/0059345 A1* | 2/2020 | Pelletier | H04L 1/16 |
| 2020/0374725 A1* | 11/2020 | Chen | H04B 7/0626 |
| 2021/0385681 A1* | 12/2021 | Li | H04W 72/044 |
| 2022/0104059 A1 | 3/2022 | Hu | |
| 2023/0025902 A1* | 1/2023 | Xu | H04W 72/51 |
| 2023/0362764 A1* | 11/2023 | Zhang | H04W 36/0088 |
| 2024/0098540 A1* | 3/2024 | Kazmi | H04L 5/0048 |

FOREIGN PATENT DOCUMENTS

| | | |
|---|---|---|
| CN | 111918303 A | 11/2020 |
| CN | 112399459 A | 2/2021 |
| WO | 2020248261 A1 | 12/2020 |

OTHER PUBLICATIONS

International Search Report in the international application No. PCT/CN2021/078523, mailed on Nov. 18, 2021.

Written Opinion of the International Search Authority in the international application No. PCT/CN2021/078523, mailed on Nov. 18, 2021.

3GPP TS 38.331 V16.3.1 (Jan. 2021), 3rd Generation Partnership Project; Technical Specification Group Radio Access Network; NR; Radio Resource Control (RRC) protocol specification, (Release 16).

3GPP TSG RAN Meeting #89e RP-202119, E-meeting, Sep. 14-18, 2020, Source: Intel Corporation, MediaTek Inc., Title: New WI Proposal: NR measurement gap enhancements, Document for: Approval, Agenda Item: 9.1.2.

Supplementary European Search Report in the European application No. 21928427.0, mailed on Dec. 8, 2023. 15 pages.

OPPO: "Views on pre-configured MGpattern (s) for NR_MG_enh", 3GPP Draft; R4-2101537, 3rd Generation Partnership Project (3GPP), Mobile Competence Centre; 650, Route Des Lucioles;F-06921 Sophia-Antipolis Cedex; France vol. RAN WG4, No. Electronic Meeting; Jan. 25, 2021-Feb. 5, 2021 Jan. 15, 2021 (Jan. 15, 2021), XP052180041, paragraph 2, Figure 1. 4 pages.

CMCC: "Discussion on pre-configured MG pattern (s)", 3GPP Draft; R4-2100871, 3rd Generation Partnership Project (3GPP), Mobile Competence Centre; 650, Route Des Lucioles; F-06921 Sophia-Antipolis Cedex; France vol. RAN WG4, No. Electronic Meeting; Jan. 25, 2021-Feb. 5, 2021 Jan. 15, 2021 (Jan. 15, 2021), XP051972067, paragraph 2. 2 pages.

Ericsson: "Overview of requirements for pre-configured measurement gaps", 3GPP Draft; R4-2102655, Jan. 15, 2021, XP052180877, pp. 1-8.

First Office Action of the European application No. 21928427.0, issued on Aug. 22, 2024. 17 pages.

* cited by examiner

METHOD AND APPARATUS FOR DETERMINING MEASUREMENT GAP, AND TERMINAL DEVICE

CROSS-REFERENCE TO RELATED APPLICATION

This is a continuation of International Application No. PCT/CN2021/078523 filed on Mar. 1, 2021, which is incorporated herein by reference in its entirety.

BACKGROUND

The network side may configure BandWidth Parts (BWPs) of one or more Serving Cells for a terminal device. For each serving cell, one or more dedicated BWPs may be configured for the serving cell, and only one dedicated BWP can be activated at one time. For one serving cell, if the serving cell is configured with a plurality of dedicated BWPs, an activated dedicated BWP may be switched among the plurality of dedicated BWPs.

However, the serving cells activate different dedicated BWPs, which may change the case of whether measurement for a certain frequency point requires a measurement gap. In other words, the number of frequency points measured using a certain measurement gap may also change. Therefore, configuration of the measurement gap according to User Equipment (UE) granularity has a poor flexibility, and there is a need to improve how to configure and use the measurement gap.

SUMMARY

The embodiments of the present disclosure relate to the field of mobile communication technology, and provide a method and apparatus for determining a measurement gap, and a terminal device.

The embodiments of the present disclosure provide a method for determining a measurement gap, which includes the following operations.

A terminal device determines that switching from a source BWP to a target BWP is triggered. Switching of the source BWP is associated with a first measurement gap configuration, and the target BWP is associated with a second measurement gap configuration.

The terminal device determines an activated or enabled measurement gap configuration from the first measurement gap configuration and the second measurement gap configuration, and performs measurement using the activated or enabled measurement gap configuration.

The embodiments of the present disclosure provide an apparatus for determining a measurement gap, applicable to a terminal device. The apparatus includes a first determining unit, a second determining unit, and a measurement unit.

The first determining unit is configured to determine that switching from a source BWP to a target BWP is triggered. Switching of the source BWP is associated with a first measurement gap configuration, and the target BWP is associated with a second measurement gap configuration.

The second determining unit is configured to determine an activated or enabled measurement gap configuration from the first measurement gap configuration and the second measurement gap configuration.

The measurement unit is configured to perform measurement using the activated or enabled measurement gap configuration.

The embodiments of the present disclosure provide a terminal device, including a processor and a memory. The memory is used to store a computer program, and the processor is used to call and run the computer program stored in the memory to perform the method for determining a measurement gap as described above.

The embodiments of the present disclosure provide a chip, used to implement the method for determining a measurement gap as described above.

Specifically, the chip includes a processor, configured to call and run a computer program in a memory, to enable a device installed with the chip to perform the method for determining a measurement gap as described above.

The embodiments of the present disclosure provide a computer-readable storage medium, used to store a computer program that enables a computer to perform the method for determining a measurement gap as described above.

The embodiments of the present disclosure provide a computer program product, including computer program instructions that cause a computer to perform the method for determining a measurement gap as described above.

The embodiments of the present disclosure provide a computer program that, when executed on a computer, causes the computer to perform the method for determining a measurement gap as described above.

Through the technical solutions described above, the measurement gap configuration is associated with the BWP, thereby configuring the measurement gap configuration according to the BWP granularity. BWP switching will lead to measurement gap switching, and the technical solutions of the embodiments of the present disclosure specify how to activate or enable the measurement gap configuration, and use the activated measurement gap configuration during the measurement gap switching.

BRIEF DESCRIPTION OF THE DRAWINGS

The drawings described herein are used to provide a further understanding of the disclosure and form a part of the disclosure. The schematic embodiments of the disclosure and the description thereof are used to explain the disclosure and do not constitute an improper limitation of the disclosure. In the drawings.

DETAILED DESCRIPTION

The technical solutions in the embodiments of the disclosure will be described below in combination with the drawings in the embodiments of the disclosure. It is apparent that the described embodiments are not all embodiments but part of embodiments of the disclosure. All other embodiments obtained by those of ordinary skill in the art based on the embodiments in the disclosure without creative work shall fall within the scope of protection of the disclosure.

The technical solutions of the embodiments of the present disclosure may be applied to various communication systems, such as a Long Term Evolution (LTE) system, an LTE Frequency Division Duplex (FDD) system, an LTE Time Division Duplex (TDD) system, a 5G communication system or a future communication system, etc.

Figure 1:
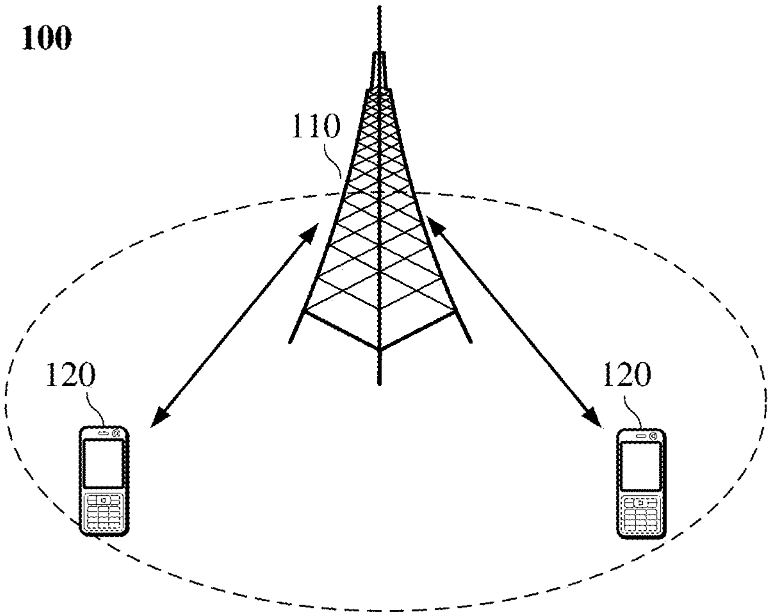
FIG. 1 is a schematic diagram of a communication system architecture provided by an embodiment of the present disclosure.

Exemplarily, a communication system 100 to which the embodiments of the present disclosure is applied may be illustrated in FIG. 1. The communication system 100 may include a network device 110, which may be a device communicating with a terminal 120 (also referred to as a communication terminal, terminal). The network device 110 may provide communication coverage for a specific geographic area and may communicate with a terminal located within the coverage area. In one example, the network device 110 may be an Evolutional Node B (eNB or eNodeB) in an LTE system, or a radio controller in a Cloud Radio Access Network (CRAN), or the network device may be a mobile switching center, a relay station, an access point, a vehicle-mounted device, a wearable device, a hub, a switch, a bridge, a router, a network-side device in a 5G network, a network device in a future communication system, and the like.

The communication system 100 also includes at least one terminal device 120 located within the coverage of the network device 110. The "terminal" used herein includes, but is not limited to, connection via wired lines, such as connection via Public Switched Telephone Networks (PSTN), Digital Subscriber Line (DSL), digital cables, direct cables; and/or another data connection/network; and/or via a wireless interface, such as for a cellular network, a Wireless Local Area Network (WLAN), a digital television network such as DVB-H network, a satellite network, a AM-FM broadcast transmitter; and/or means of another terminal arranged to receive/transmit a communication signal; and/or an Internet of Things (IoT) device. A terminal device configured to communicate via a wireless interface may be referred to as a "wireless communication terminal", "wireless terminal" or "mobile terminal". Examples of mobile terminals include, but are not limited to, satellite or cellular telephones; a Personal Communications System (PCS) terminal that may combine a cellular radio telephone with data processing, fax and data communications capability; a Personal Digital Assistant (PDA) that may include a radio telephone, a pager, Internet/intranet access, a Web browser, memo pad, calendar and/or Global Positioning System (GPS) receiver; and a conventional laptop and/or palmtop receiver or other electronic devices including a radio telephone transceiver. The terminal device may be referred to an access terminal, a User Equipment (UE), a subscriber unit, a subscriber station, a mobile station, a mobile radio station, a remote station, a remote terminal, a mobile device, a user terminal, a terminal, a wireless communication device, a user agent or a user device. The access terminal may be a cellular telephone, a cordless telephone, a Session Initiation Protocol (SIP) telephone, a Wireless Local Loop (WLL) station, a Personal Digital Assistant (PDA), a handheld device with a wireless communication function, a computing device or other processing device connected to a wireless modem, a vehicle-mounted device, a wearable device, a terminal device in a 5G network, a terminal device in a future evolved PLMN or the like.

In one example, Device to Device (D2D) communication may be performed between the terminal devices 120.

In one example, the 5G communication system or 5G network may also be referred to as a New Radio (NR) system or NR network.

FIG. 1 exemplarily illustrates one network device and two terminal devices. In one example, the communication system 100 may include multiple network devices and another number of terminal devices may be included within the coverage of each network device, which is not limited in the embodiments of the present disclosure.

In one example, the communication system 100 may also include another network entity such as a network controller or a mobility management entity, which is not limited in the embodiments of the present disclosure.

It is to be understood that a device with communication function in the network/system in the embodiments of the present disclosure may be referred to as a communication device. Taking the communication system 100 illustrated in FIG. 1 as an example, communication devices may include the network device 110 and the terminal 120 with the communication function. The network device 110 and the terminal 120 may be specific devices mentioned above, and details are not described herein. The communication device may further include another device in the communication system 100, for example, another network entity such as a network controller or a mobility management entity, which is not limited in the embodiments of the present disclosure.

It is to be understood that terms "system" and "network" in the disclosure may usually be exchanged. In the disclosure, the term "and/or" is only an association relationship describing associated objects and represents that three relationships may exist. For example, A and/or B may represent three conditions: i.e., independent existence of A, existence of both A and B and independent existence of B. In addition, character "/" in the disclosure usually represents that previous and next associated objects form an "or" relationship.

To facilitate understanding of the technical solutions of the embodiments of the present disclosure, the technical solutions related to the embodiments of the present disclosure are described below.

With the pursuit of speed, latency, high-speed mobility and energy efficiency, as well as the diversity and complexity of services in future life, the 3rd Generation Partnership Project (3GPP) international standard organization began to research and develop 5G. The main application scenarios of 5G are: Enhanced Mobile Broadband (eMBB), Ultra-Reliable Low-Latency Communications (URLLC), and massive Machine-Type Communications (mMTC).

On one hand, eMBB still aims to acquiring multimedia content, services and data by users, and its demand is growing rapidly. On the other hand, since the eMBB may be deployed in different scenarios, such as indoor, urban, rural scenarios, etc., and the differences in capabilities and requirements for the different scenarios are relatively large, it cannot be generalized and must be analyzed in detail with reference to specific deployment scenarios. Typical applications of URLLC include: industrial automation, power automation, telemedicine operation (surgery), traffic safety and so on. Typical characteristics of mMTC include: high connection density, small data size, latency-insensitive services, low cost and long service life of modules, and so on.

In the early deployment of NR, it is difficult to obtain complete NR coverage, so the typical network coverage includes wide-area LTE coverage and NR island coverage. Moreover, a large number of LTE are deployed below 6 GHz, and few spectrum below 6 GHz are available for 5G. Therefore, it is necessary to study the spectrum application above 6 GHz for NR, but the high frequency band has a limited coverage and fast signal fading. At the same time, in order to protect the early investment of mobile operators in LTE, a working mode of tight interworking between LTE and NR is proposed.

In order to realize 5G network deployment and commercial application as soon as possible, the 3GPP first completed the first 5G version, namely LTE-NR Dual Connectivity (EN-DC). In the EN-DC, an LTE base station (eNB) serves as a Master Node (MN) and an NR base station (gNB or en-gNB) serves as a Secondary Node (SN), which are connected to an EPC core network. In the later stage of R15, other DC modes, i.e., NE-DC, 5GC-EN-DC and NR DC, will be supported. In the NE-DC, an NR base station serves as the MN and an eLTE base station serves as the SN, which are connected to the 5GC core network. In the 5GC-EN-DC, an eLTE base station serves as the MN and an NR base station serves as the SN, which are connected to the 5GC core network. In the NR DC, an NR base station serves as the MN and an NR base station serves as the SN, which are connected to the 5GC core network.

Figure 2:
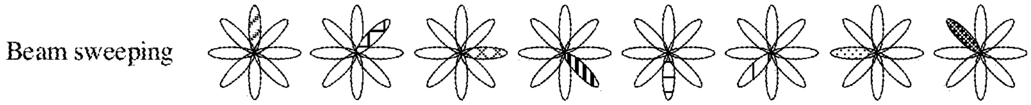
FIG. 2 is a schematic diagram of Beam sweeping provided by an embodiment of the present disclosure.
Figure 3:
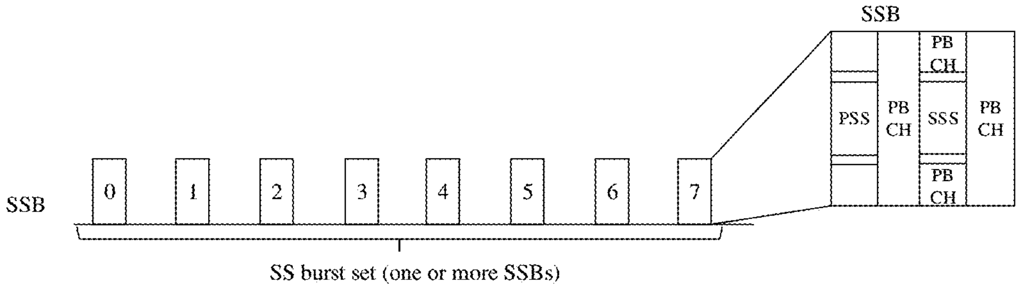
FIG. 3 is a schematic diagram of an SSB provided by an embodiment of the present disclosure.
Figure 4:
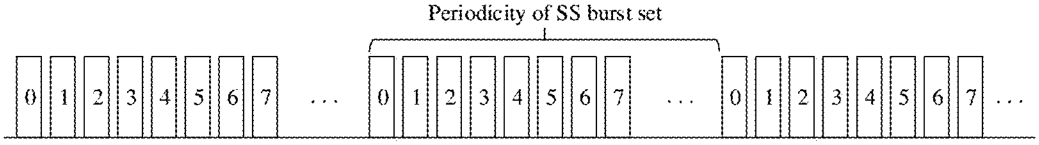
FIG. 4 is a schematic diagram of an SSB burst set period provided by an embodiment of the present disclosure.

NR may also be deployed independently. NR will be deployed at high frequency in the future. In order to improve the coverage, in 5G, the mechanism of beam sweeping is introduced to meet the coverage requirements (trading space for coverage and trading time for space), as illustrated in FIG. 2. After the beam sweeping is introduced, a synchronization signal needs to be sent in each beam direction. The synchronization signal in 5G is in the form of an SS/PBCH block (SSB), including a Primary Synchronization Signal (PSS), a Secondary Synchronization Signal (SSS) and a Physical Broadcast Channel (PBCH), as illustrated in FIG. 3. The synchronization signals in 5G appear periodically in time domain in the form of SS burst sets, as illustrated in FIG. 4.

The number of beams actually transmitted by each cell is determined by network side configuration, but the frequency point where the cell is located decides the maximum number of beams that can be configured, as illustrated in Table 1 below.

TABLE 1

| Frequency range | L (maximum number of beams) |
|---|---|
| up to 3 (2.4) GHz | 4 |
| 3 (2.4) GHz-6 GHz | 8 |
| 6 GHZ-52.6 GHZ | 64 |

In Radio Resource Management (RRM) measurements, the signal to be measured may be SSB, i.e., an SSS signal or a Demodulation Reference Signal (DMRS) signal of a PBCH in an SSB is measured to obtain a beam measurement result and a cell measurement result. In addition, a terminal device in a Radio Resource Control (RRC) connection state may further configure a Channel Status Indicator Reference Signal (CSI-RS) as a reference signal for cell measurement.

Figure 5:
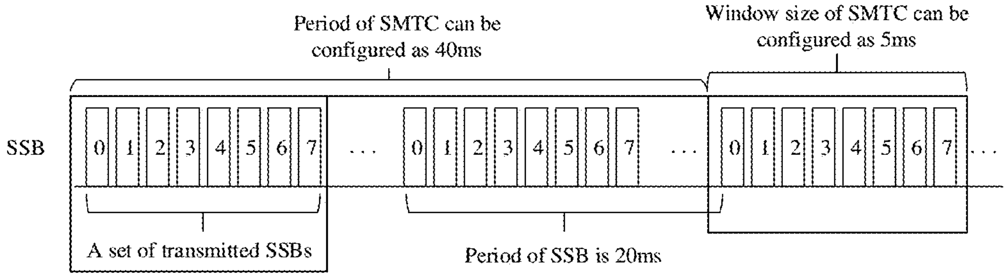
FIG. 5 is a schematic diagram of an SMTC provided by an embodiment of the present disclosure.

For SSB-based measurements, the actual transmission location of the SSB for each cell may be different, and the periodicity of the SS burst set may also be different. Therefore, in order to save energy in the measurement process of the terminal device, the network side configures SS/PBCH block measurement timing configuration (SMTC) for the terminal device, and the terminal device only needs to measure in the SMTC window, as illustrated in FIG. 5.

Since the locations of the SSBs actually transmitted by each cell may be different, in order to enable the terminal device to find the locations of the SSBs actually transmitted as soon as possible, the network side may also configure the terminal device with the actual SSB transmission locations measured by the UE, for example, the union of the actual SSB transmission locations of all measured cells, for example, at 3-6 GHz, the network side indicates a bitmap: 10100110, through which the terminal device is informed to only measure the SSBs with the SSB indexes of 0, 2, 5 and 6 among the 8 SSB candidate locations.

Radio Resource Management (RRM) measurement is divided into two types: intra-frequency measurement and inter-frequency measurement. For inter-frequency measurement, measurement gap configuration may be required. As illustrated in Table 2 below, the measurement gap configuration includes the following information: measurement gap repetition period (MGRP), measurement gap offset (GapOffset), measurement gap length (MGL), measurement gap timing advance (MGTA), and so on.

TABLE 2

| | |
|---|---|
| GapConfig ::= | SEQUENCE { |
| gapOffset | INTEGER (0..159), |
| mgl | ENUMERATED {ms1dot5, ms3, ms3dot5, ms4, ms5dot5, ms6}, |
| mgrp | ENUMERATED {ms20, ms40, ms80, ms160}, |
| mgta | ENUMERATED {ms0, ms0dot25, ms0dot5}, |
| ..., | |

TABLE 2-continued

```
  [[
  refServCellIndicator          ENUMERATED {pCell, pSCell, mcg-FR2}
OPTIONAL   -- Cond NEDCorNRDC
  ]]
}
```

Figure 6:
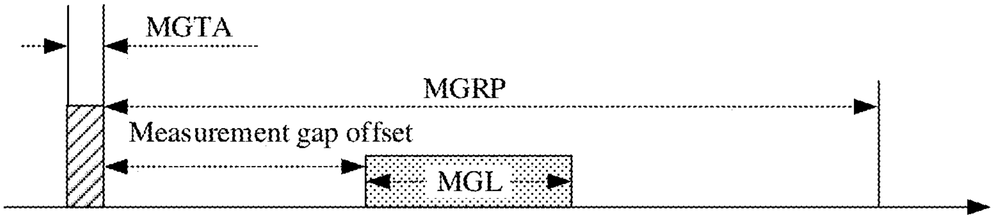
FIG. 6 is a schematic diagram of a measurement gap provided by an embodiment of the present disclosure.

Each information in the measurement gap configuration may be illustrated with reference to FIG. 6, where MGRP represents a repetition period of the measurement gap, GapOffset represents an offset of the starting location of the measurement gap from a starting location of a MGRP, MGL represents a length of the measurement gap, and MGTA is used to determine timing of the measurement gap.

For a terminal device in RRC connection state, if inter-frequency measurement or inter-system measurement is to be performed, the network side is required to configure the measurement gap. During the duration of the measurement gap, the terminal device stops measurement of all services and serving cells. In addition, intra-frequency measurement may also need a measurement gap.

NR supports measurement gaps of UE granularity (per UE) configuration and measurement gaps of FR granularity (per FR) configuration. The related configuration of measurement gaps of per UE configuration may also be referred to as per-UE gap configuration, and the related configuration of measurement gaps of per FR configuration may also be referred to as per-FR gap configuration.

For Per-UE Gap Configuration

An MN decides the per-UE gap configuration and the related gap sharing configuration. Further, the MN may send the per-UE gap configuration to the terminal device, and the MN may also notify an SN about the per-UE gap configuration and gap purpose (e.g., per-UE). Further, the SN may notify the MN about the FR1 frequency list and the FR2 frequency list to be configured by the SN as gap configuration auxiliary information.

For Per-FR Gap Configuration

1) For NG-DC or EN-DC, an MN decides FR1 gap configuration and related gap sharing configuration, and an SN decides FR2 gap configuration and related gap sharing configuration. Further, the MN may configure the per-FR1 gap to the terminal device, and the MN may also notify the SN about the per-FR1 gap configuration and gap purpose (e.g., per-FR1). Further, the MN notifies the SN about the FR2 frequency list to be configured by the MN as the gap configuration auxiliary information, and the SN notifies the MN about the FR1 frequency list to be configured by the SN as the gap configuration auxiliary information.
2) For both NE-DC and NR-DC, the MN decides FR1 gap configuration and related gap sharing configuration, and FR2 gap configuration and related gap sharing simultaneously. Further, for the NE-DC, the MN notifies the SN about the per-FR1 gap configuration, and the SN provides the MN with a measurement gap request, but does not need any frequency list. For the NR-DC, the MN notifies the SN about the per-FR1 gap configuration, per-FR2 gap configuration, and gap purpose, and the SN may indicate to the MN about the FR1 frequency list and the FR2 frequency list to be configured by the SN.

There are many types of measurement gaps, and Table 3 shows configuration of 24 gap patterns. Different gap patterns correspond to different measurement periods (i.e., MGRP) and measurement lengths (i.e., MGL). Some gap patterns are used for measuring FR1 frequency points, and some gap patterns are used for measuring FR2 frequency points.

TABLE 3

| Gap pattern identifier | Measurement gap length (MGL, ms) | Measurement gap repetition period (MGRP, ms) |
|---|---|---|
| 0 | 6 | 40 |
| 1 | 6 | 80 |
| 2 | 3 | 40 |
| 3 | 3 | 80 |
| 4 | 6 | 20 |
| 5 | 6 | 160 |
| 6 | 4 | 20 |
| 7 | 4 | 40 |
| 8 | 4 | 80 |
| 9 | 4 | 160 |
| 10 | 3 | 20 |
| 11 | 3 | 160 |
| 12 | 5.5 | 20 |
| 13 | 5.5 | 40 |
| 14 | 5.5 | 80 |
| 15 | 5.5 | 160 |
| 16 | 3.5 | 20 |
| 17 | 3.5 | 40 |
| 18 | 3.5 | 80 |
| 19 | 3.5 | 160 |
| 20 | 1.5 | 20 |
| 21 | 1.5 | 40 |
| 22 | 1.5 | 80 |
| 23 | 1.5 | 160 |

In NR, the measurement gap is configured to the terminal device by a RRC dedicated signaling and is a configuration parameter of per UE.

In 5G, the maximum channel bandwidth may be 400 MHZ (referred to as wideband carrier). Compared with the maximum bandwidth of 20 M in LTE, the bandwidth of the wideband carrier is very large. If the terminal device keeps operating on the wideband carrier, the terminal device has high power consumption. Therefore, it is recommended that the Radio Frequency (RF) bandwidth of the terminal device may be adjusted according to the actual throughput of the terminal device. Therefore, the concept of BWP is introduced to optimize the power consumption of the terminal device. For example, if the terminal device has a low rate, a smaller BWP may be configured for the terminal device, and if the terminal device has high rate requirement, a larger BWP may be configured for the terminal device. If the terminal device supports a high rate or operates in a Carrier Aggregation (CA) mode, a plurality of BWPs may be configured for the terminal device. Another purpose of BWP is to trigger the coexistence of a plurality of numerologies in a cell, for example, BWP1 corresponds to numerology 1 and BWP2 corresponds to numerology 2.

A terminal device in an idle or inactive state resides on an initial BWP, the initial BWP is visible to the terminal device in the idle or inactive state, and the terminal device may obtain information from the initial BWP, such as Master Information Block (MIB), Remaining Minimum System Information (RMSI), Other System Information (OSI), paging and other information.

For a terminal device in RRC connection state, the terminal may be configured with up to 4 uplink BWPs and up to 4 downlink BWPs through the RRC dedicated signaling, but only one uplink BWP and one downlink BWP can be activated at the same time. The first activated BWP in the configured BWPs may be indicated in the RRC dedicated signaling. At the same time, when the terminal device is in the RRC connection state, the terminal device may switch between different BWPs through Downlink Control Information (DCI). After a carrier in an inactive state enters an active state, the first activated BWP is the first activated BWP configured in the RRC dedicated signaling.

The BWPs are configured at the granularity of serving cells, and the network side may configure dedicated BWPs of one or more serving cells for the terminal device. For each serving cell, one or more dedicated BWPs (such as, up to 4 uplink BWPs and up to 4 downlink BWPs) may be configured for the serving cell, and only one dedicated BWP can be activated at the same time (such as, one uplink BWP and/or one downlink BWP are activated). For one serving cell, if the serving cell is configured with a plurality of dedicated BWPs, the dedicated BWP activated by the serving cell may be switched among the plurality of dedicated BWPs.

However, the serving cells activate different dedicated BWPs, which may change the case of whether measurement for a certain frequency point requires a measurement gap. In other words, the number of frequency points measured using a certain measurement gap may also change. Therefore, configuration of the measurement gap according to User Equipment (UE) granularity has a poor flexibility, and how to configure and use the measurement gap needs to be further improved.

Therefore, the following technical solutions of the embodiments of the present disclosure are provided. In the technical solutions of the embodiments of the present disclosure, the measurement gaps are configured according to the BWP granularity, so that the used measurement gap may be changed according to the current radio resource use state of the terminal device (i.e., the BWP where the terminal device is currently located).

It should be noted that the network device in the embodiments of the present disclosure may be, but is not limited to, a base station, and the network device may also be other device with a control function.

Figure 7:
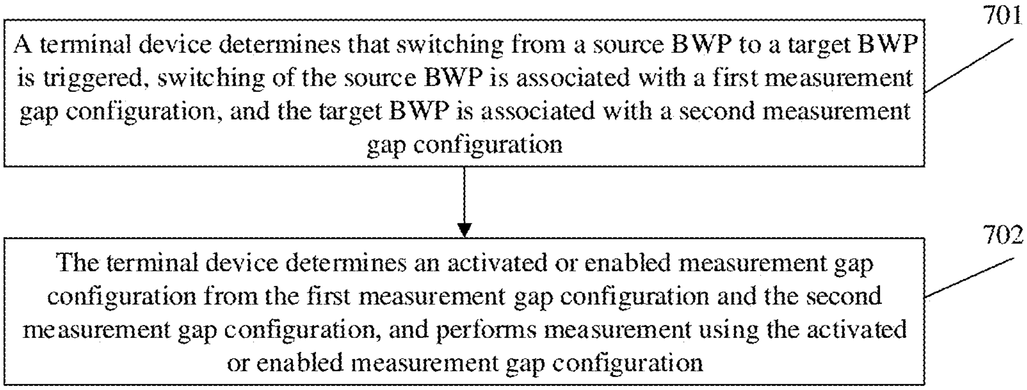
FIG. 7 is a flowchart of a method for determining a measurement gap provided by an embodiment of the present disclosure.

FIG. 7 is a flowchart of a method for determining a measurement gap provided by an embodiment of the present disclosure. As illustrated in FIG. 7, the method for determining the measurement gap includes the following operations.

In 701, a terminal device determines that switching from a source BWP to a target BWP is triggered. Switching of the source BWP is associated with a first measurement gap configuration, and the target BWP is associated with a second measurement gap configuration.

In an embodiment of the present disclosure, the network device may preconfigure at least one measurement gap configuration to the terminal device. Specifically, the terminal device receives first configuration information sent by the network device. The first configuration information includes at least one measurement gap configuration, and each of the at least one measurement gap configuration is associated with a measurement gap index. In some optional implementations, the first configuration information is carried in RRC dedicated signaling.

In some optional implementations, each measurement gap configuration is configured with a priority, and the priority may also be referred to as a measurement gap usage priority used to determine whether the measurement gap configuration is activated or enabled preferentially.

As an example, the network device configures at least one measurement gap configuration to the terminal device through the RRC dedicated signaling. Each measurement gap configuration is used to determine a type of measurement gap (or gap pattern), and each measurement gap configuration is associated with a measurement gap index, which may also be understood as each measurement gap (or gap pattern) being associated with a measurement gap index. Herein, the measurement gap index may be a gap index, a gap pattern id or the like.

In an embodiment of the present disclosure, the measurement gap configuration is configured according to the BWP granularity. In order to realize configuring the measurement gap configuration according to the BWP granularity, each BWP configuration may be associated with a measurement gap index. Specifically, the terminal device receives second configuration information sent by the network device. The second configuration information includes at least one serving cell configuration, each of the at least one serving cell configuration includes at least one BWP configuration, and each of the at least one BWP configuration is associated with a measurement gap index. In some optional implementations, the second configuration information is carried in RRC dedicated signaling.

As an example, the network device configures at least one serving cell configuration to the terminal device through the RRC dedicated signaling. Each serving cell configuration includes at least one BWP configuration, and each BWP configuration is associated with a measurement gap index. Herein, the measurement gap index may be a gap index, a gap pattern id or the like. For example, the network device configures 4 serving cell configurations to the terminal device through the RRC dedicated signaling, and each serving cell configuration includes 4 BWP configurations, then there are a total of 16 BWP configurations, and each of the 16 BWP configurations is associated with a measurement gap index.

In the above solution, the above BWP may be a dedicated BWP.

In the above solution, the above BWP may be a downlink BWP, and may also be an uplink BWP.

In an embodiment of the present disclosure, for the case that one serving cell is configured with a plurality of BWPs, only one BWP is in the active state, and the terminal device performs communication on the BWP in the active state. Since different BWPs represent different spectrum ranges, the wireless resource usage states of the terminal device are different when the terminal device is in different BWPs. The activated BWP of the serving cell may be switched among a plurality of BWPs. Since the BWP configuration is associated with the measurement gap index, BWP switching will lead to measurement gap switching. It should be noted that BWP switching refers to the switching that occurs when a BWP is activated, and the measurement gap switching refers to the switching that occurs when a gap is activated.

In an embodiment of the present disclosure, the terminal device determines that switching from the source BWP to the target BWP is triggered in the following modes.

Mode 1: the terminal device determines based on a BWP switching command that the switching from the source BWP to the target BWP is triggered.

Specifically, after receiving the BWP switching command, the terminal device switches to the target BWP.

In some optional implementations, the BWP switching command is carried in DCI.

In some optional implementations, the BWP switching command is carried in RRC signaling.

Mode 2: the terminal device determines based on a first timer that the switching from the source BWP to the target BWP is triggered.

Specifically, the terminal device starts the first timer after entering the source BWP, and switches to the target BWP when the first timer expires.

In the embodiments of the present disclosure, since switching of the source BWP is associated with the first measurement gap configuration and the target BWP is associated with the second measurement gap configuration, determination of the terminal device that the switching from the source BWP to the target BWP is triggered may also be understood as the terminal device determining that switching from the first measurement gap configuration to the second measurement gap configuration is triggered.

In 702, the terminal device determines an activated or enabled measurement gap configuration from the first measurement gap configuration and the second measurement gap configuration, and performs measurement using the activated or enabled measurement gap configuration.

In the embodiments of the present disclosure, after the terminal device determines that switching from the source BWP to the target BWP is triggered, it is necessary to clarify how to use the preconfigured measurement gap configuration, which is described below.

First Solution

If a first condition is met, the terminal device immediately activates or enables the second measurement gap configuration after determining that the switching from the source BWP to the target BWP is triggered, and determines that the activated or enabled measurement gap configuration is the second measurement gap configuration.

In some optional implementations, the terminal device deactivates or de-configures the first measurement gap configuration after determining that the switching from the source BWP to the target BWP is triggered.

The first condition in the above solution will be described below, and for convenience of description, the concept of a first time is introduced. The switching from the source BWP to the target BWP is triggered at the first time. In addition, it should be noted that in the following description, the duration of the measurement gap may also be referred to as gap duration, and may be determined based on the MGL.

Solution 1-1): in some optional implementations, the first condition includes: the first time is not within a duration of the first measurement gap and is within a duration of the second measurement gap.

Solution 1-2): in some optional implementations, the first condition includes: the first time is within the duration of the first measurement gap and within the duration of the second measurement gap.

Solution 1-3): in some optional implementations, the first condition includes: a priority of the second measurement gap configuration is higher than a priority of the first measurement gap configuration.

Solution 1-4): in some optional implementations, the first condition includes: the terminal device receives first indication information sent by the network device, and the first indication information is used to instruct the terminal device to immediately activate or enable the second measurement gap configuration after determining that the switching from the source BWP to the target BWP is triggered.

It should be noted that the above solution 1-4) may be implemented in conjunction with solution 1-2).

Second Solution

If a second condition is met, after determining that the switching from the source BWP to the target BWP is triggered, the terminal device waits for a first duration and then activates or enables the second measurement gap configuration, and determines that the activated or enabled measurement gap configuration is the second measurement gap configuration.

In an example, an ending time of the first duration is an ending time of the duration of the first measurement gap. Alternatively, the first duration is determined based on a BWP switching delay, for example, the first time is equal to the BWP switching delay.

In some optional implementations, the terminal device continues to use the first measurement gap configuration for a period of time after determining that the switching from the source BWP to the target BWP is triggered, and a duration of the period of time is the first duration. The terminal device deactivates or de-configures the first measurement gap configuration after the first duration ends.

The second condition in the above solution will be described below, and for convenience of description, the concept of a first time is introduced. The switching from the source BWP to the target BWP is triggered at the first time. In addition, it should be noted that in the following description, the duration of the measurement gap may also be referred to as gap duration, and may be determined based on the MGL.

Solution 2-1): in some optional implementations, the second condition includes: the first time is within the duration of the first measurement gap, and a duration of the second measurement gap does not overlap with the duration of the first measurement gap.

Solution 2-2): in some optional implementations, the second condition includes: the first time is not within the duration of the first measurement gap and is within the duration of the second measurement gap, and the duration of the second measurement gap does not overlap with the duration of the first measurement gap.

Solution 2-3): in some optional implementations, the second condition includes: the first time is within the duration of the second measurement gap and within the duration of the first measurement gap.

Solution 2-4): in some optional implementations, the second condition includes: a priority of the first measurement gap configuration is higher than a priority of the second measurement gap configuration.

Solution 2-5): in some optional implementations, the second condition includes: the terminal device receives second indication information sent by the network device, and the second indication information is used for instructing the terminal device to, after determining that the switching from the source BWP to the target BWP is triggered, activate the second measurement gap configuration after waiting for the first duration.

Solution 2-6): in some optional implementations, the second condition includes: the first time is within the duration of the second measurement gap, and the duration of the second measurement gap at least partially overlaps with the duration of the first measurement gap.

It should be noted that the above solution 2-5) may be implemented in conjunction with any one of solutions 2-1) to 2-4).

According to the technical solutions of the embodiments of the present disclosure, the switching of the BWP may trigger the switching of the measurement gap, and it is clarified by the protocol constraint, the priority of the measurement gap configuration, or the indication from the network side when the measurement gap configuration is activated or enabled.

The technical solutions of the embodiments of the present disclosure are described below in combination with specific application examples. It should be noted that in the following description, the source measurement gap configuration corresponds to the first measurement gap configuration in the above-mentioned solutions, and the target measurement gap configuration corresponds to the second measurement gap configuration in the above-mentioned solutions. Likewise, the source measurement gap corresponds to a measurement gap determined by the first measurement gap configuration in the above-mentioned solutions, and the target measurement gap corresponds to a measurement gap determined by the second measurement gap configuration in the above-mentioned solutions.

First Application Example

Figure 8A:
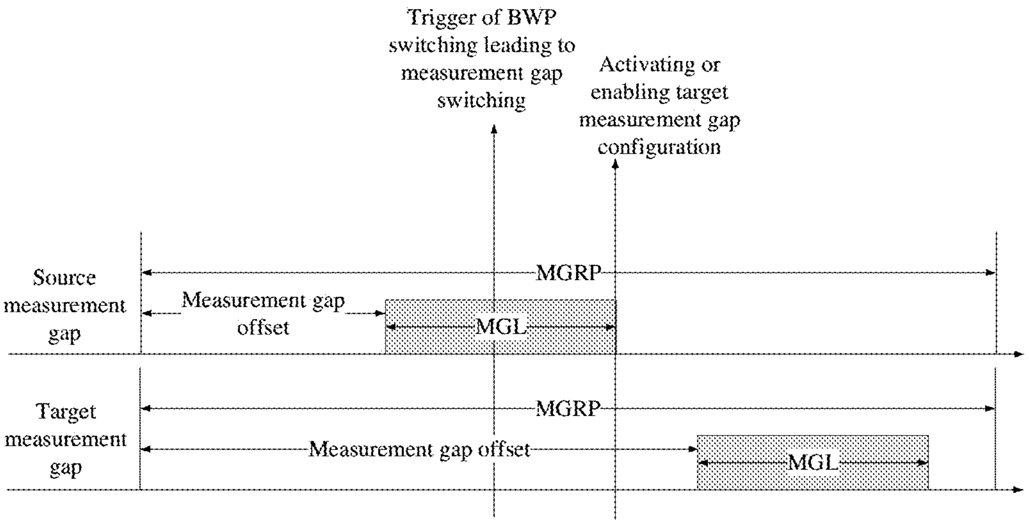
FIG. 8A is a first schematic diagram of measurement gap switching provided by an embodiment of the present disclosure.

Triggering of the BWP switching results in the measurement gap switching, and the BWP switching is triggered at a first time. Referring to FIG. 8A, if the first time is within the duration of the source measurement gap and the duration of the target measurement gap does not overlap with the duration of the source measurement gap, the terminal device continues to use the source measurement gap configuration after the first time until the duration of the source measurement gap ends, and then activates or enables the target measurement gap configuration. Herein, when the duration of the source measurement gap ends, the source measurement gap configuration immediately becomes invalid and stops, and then the terminal device performs measurement within the duration of the target measurement gap.

Second Application Example

Figure 8B:
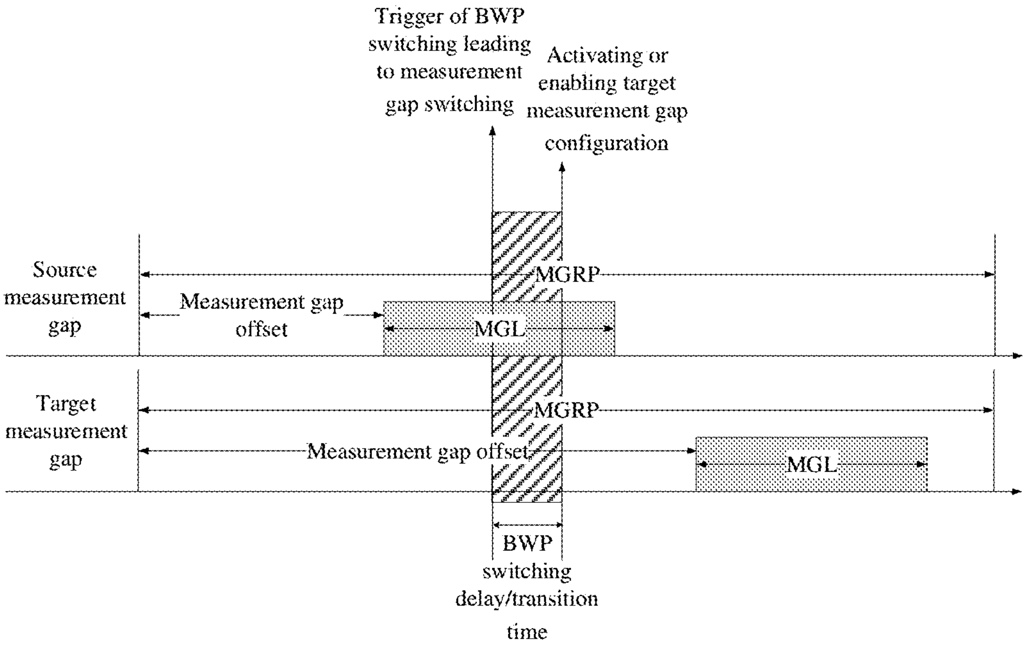
FIG. 8B is a second schematic diagram of measurement gap switching provided by an embodiment of the present disclosure.

Triggering of the BWP switching results in the measurement gap switching, and the BWP switching is triggered at a first time. Referring to FIG. 8B, if the first time is within the duration of the source measurement gap and the duration of the target measurement gap does not overlap with the duration of the source measurement gap, the terminal device continues to use the source measurement gap configuration after the first time until the BWP switching delay or the transition time ends, and then activates or enables the target measurement gap configuration. Herein, when the BWP switching delay or the transition time ends, the source measurement gap configuration immediately becomes invalid and stops, and then the terminal device performs measurement within the duration of the target measurement gap.

Third Application Example

Figure 8C:
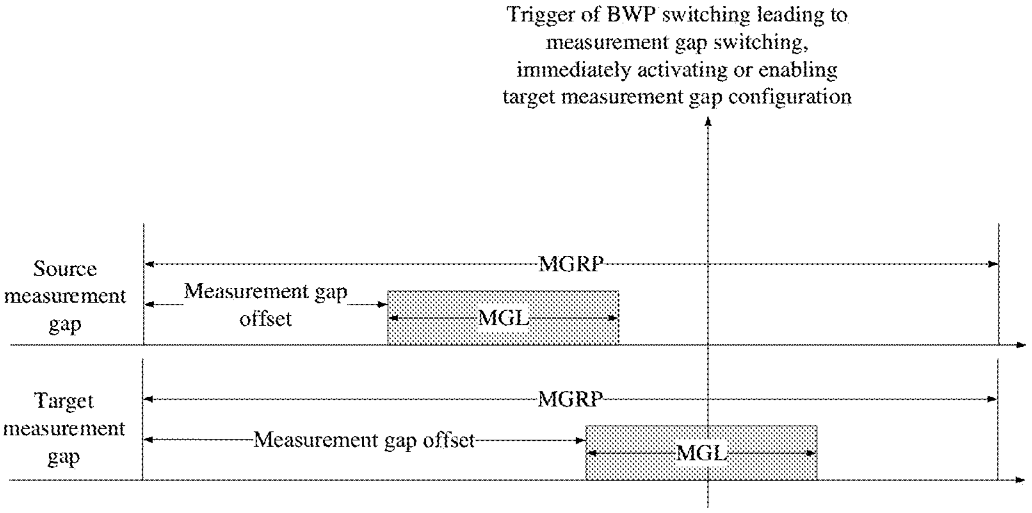
FIG. 8C is a third schematic diagram of measurement gap switching provided by an embodiment of the present disclosure.

Triggering of the BWP switching results in the measurement gap switching, and the BWP switching is triggered at a first time. Referring to FIG. 8C, if the first time is not within the duration of the source measurement gap and the first time is within the duration of the target measurement gap, the terminal device immediately activates or enables the target measurement gap configuration while the source measurement gap configuration immediately becomes invalid and stops.

Fourth Application Example

Figure 8D:
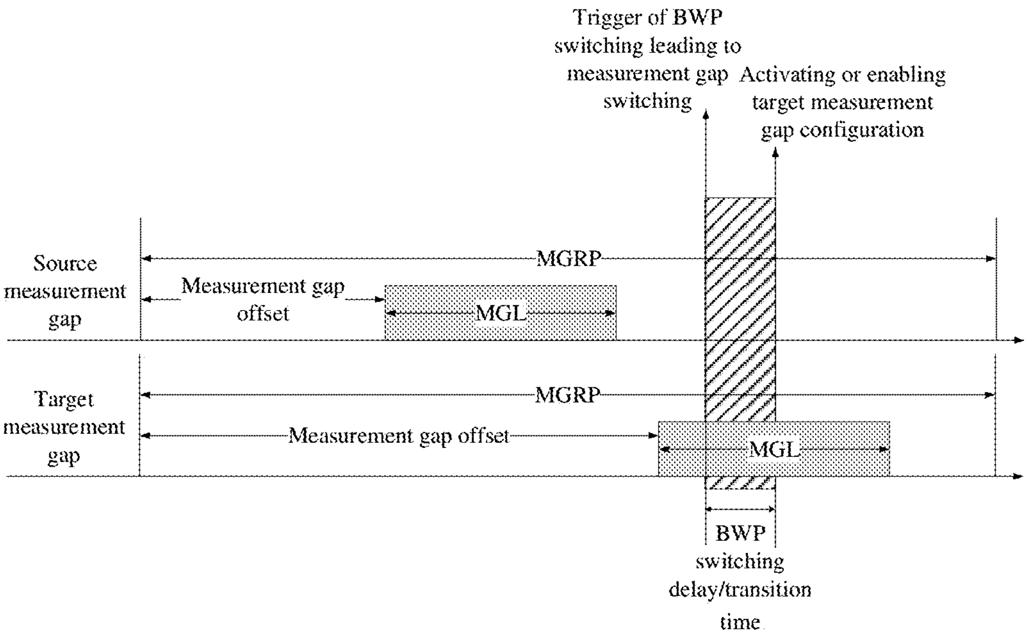
FIG. 8D is a fourth schematic diagram of measurement gap switching provided by an embodiment of the present disclosure.

Triggering of the BWP switching results in the measurement gap switching, and the BWP switching is triggered at a first time. Referring to FIG. 8D, if the first time is not within the duration of the source measurement gap but within the duration of the target measurement gap, and the duration of the target measurement gap partially overlaps with the duration of the source measurement gap, the terminal device waits for the end of the BWP switching delay or the transition time after the first time, and then activates or enables the target measurement gap configuration.

Fifth Application Example

Figure 8E:
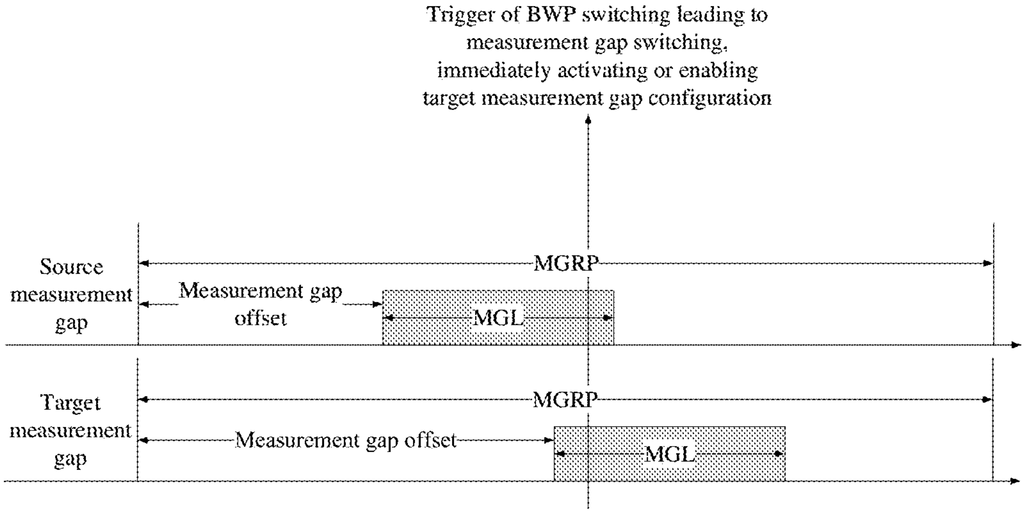
FIG. 8E is a fifth schematic diagram of measurement gap switching provided by an embodiment of the present disclosure.

Triggering of the BWP switching results in the measurement gap switching, and the BWP switching is triggered at a first time. Referring to FIG. 8E, if the first time is within the duration of the source measurement gap and within the duration of the target measurement gap (i.e., the duration of the target measurement gap partially overlaps with the duration of the source measurement gap), or the priority of the target measurement gap configuration is higher than the priority of the source measurement gap configuration, or the network side instructs the terminal device to immediately activate or enable the target measurement gap configuration after the switching is triggered, then the terminal device immediately activates or enables the target measurement gap configuration after the switching is triggered while the source measurement gap configuration immediately becomes invalid and stops.

Sixth Application Example

Figure 8F:
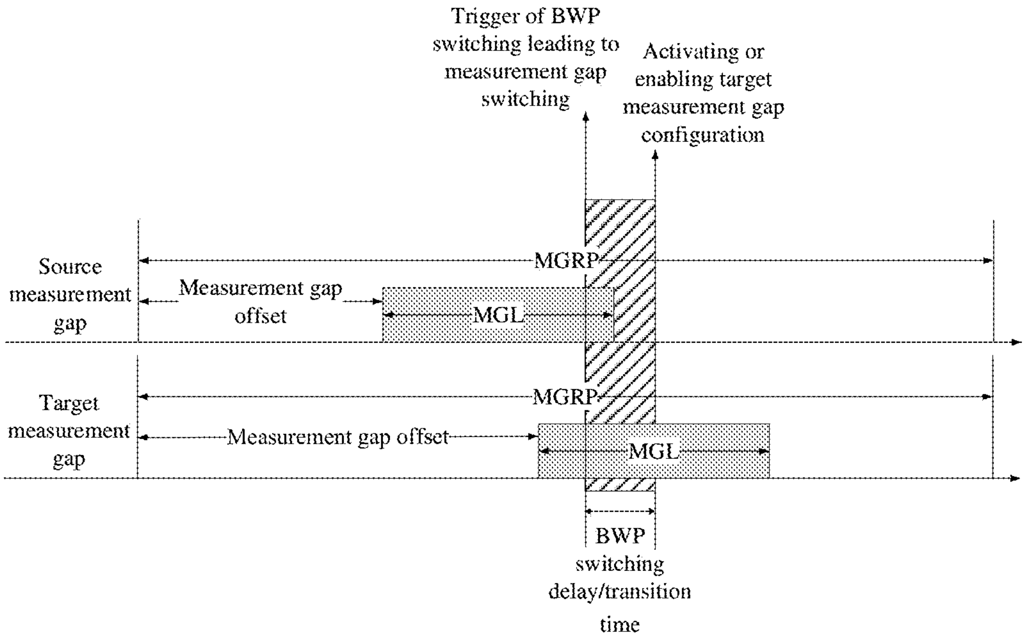
FIG. 8F is a sixth schematic diagram of measurement gap switching provided by an embodiment of the present disclosure.

Triggering of the BWP switching results in the measurement gap switching, and the BWP switching is triggered at a first time. Referring to FIG. 8F, if the first time is within the duration of the source measurement gap and within the duration of the target measurement gap (i.e., the duration of the target measurement gap partially overlaps with the duration of the source measurement gap), or the priority of the source measurement gap configuration is higher than the priority of the target measurement gap configuration, or the network side instructs the terminal device to, after the switching is triggered, wait for a duration before activating or enabling the target measurement gap configuration, the terminal device continues to use the source measurement gap configuration after the first time until the BWP switching delay or transition time ends, and then activates or enables the target measurement gap configuration.

Seventh Application Example

Triggering of the BWP switching results in the measurement gap switching, and the BWP switching is triggered at a first time. If the first time is within the duration of the source measurement gap and the duration of the target measurement gap at least partially overlaps with the duration of the source measurement gap, the terminal device continues to use the source measurement gap configuration after the first time until the BWP switching delay or the transition time ends, and then activates or enables the target measurement gap configuration.

Figure 9:
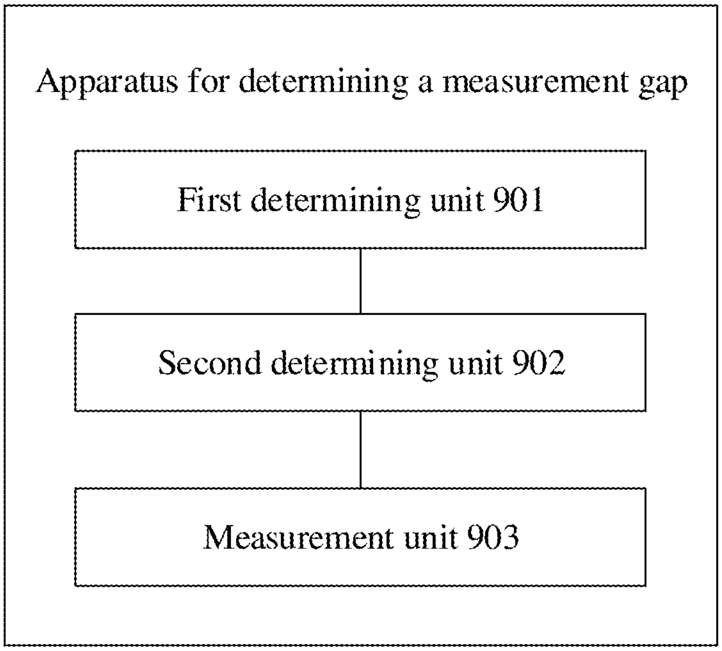
FIG. 9 is a schematic diagram of a structural composition of an apparatus for determining a measurement gap provided by an embodiment of the present disclosure.

FIG. 9 is a schematic diagram of a structural composition of an apparatus for determining a measurement gap provided by an embodiment of the present disclosure, which is applied to a terminal device. As illustrated in FIG. 9, the apparatus for determining the measurement gap includes a first determining unit 901, a second determining unit 902, and a measurement unit 903.

The first determining unit 901 is configured to determine that switching from a source BWP to a target BWP is triggered. Switching of the source BWP is associated with a first measurement gap configuration, and the target BWP is associated with a second measurement gap configuration.

The second determining unit 902 is configured to determine an activated or enabled measurement gap configuration from the first measurement gap configuration and the second measurement gap configuration.

The measurement unit 903 is configured to perform measurement using the activated or enabled measurement gap configuration.

In some optional implementations, the apparatus further includes a processing unit (not illustrated in FIG. 9). The processing unit is configured to, if a first condition is met, immediately activate or enable the second measurement gap configuration after it is determined that the switching from the source BWP to the target BWP is triggered.

The second determining unit 902 is configured to determine that the activated or enabled measurement gap configuration is the second measurement gap configuration.

In some optional implementations, the processing unit is further configured to deactivate or de-configure the first measurement gap configuration after it is determined that the switching from the source BWP to the target BWP is triggered.

In some optional implementations, the switching from the source BWP to the target BWP is triggered at a first time.

The first condition includes that: the first time is not within a duration of the first measurement gap and is within a duration of the second measurement gap.

In some optional implementations, the switching from the source BWP to the target BWP is triggered at a first time.

The first condition includes that: the first time is within a duration of the first measurement gap and within a duration of the second measurement gap.

In some optional implementations, the first condition includes that: a priority of the second measurement gap configuration is higher than a priority of the first measurement gap configuration.

In some optional implementations, the first condition includes that: the terminal device receives first indication information sent by the network device, and the first indication information is used for instructing the terminal device to immediately activate or enable the second measurement gap configuration after determining that the switching from the source BWP to the target BWP is triggered.

In some optional implementations, the apparatus further includes a processing unit. The processing unit is configured to, if a second condition is met, activate or enable, after it is determined that the switching from the source BWP to the target BWP is triggered, the second measurement gap configuration after waiting for a first duration.

The second determining unit 902 is configured to determine that the activated or enabled measurement gap configuration is the second measurement gap configuration.

In some optional implementations, the processing unit is further configured to: continue to use the first measurement gap configuration for a period of time after it is determined that the switching from the source BWP to the target BWP is triggered, in which a duration of the period of time is the first duration; and deactivate or de-configure the first measurement gap configuration after the first duration ends.

In some optional implementations, an ending time of the first duration is an ending time of the duration of the first measurement gap.

In some optional implementations, the first duration is determined based on a BWP switching delay.

In some optional implementations, the switching from the source BWP to the target BWP is triggered at a first time.

The second condition includes that: the first time is within the duration of the first measurement gap, and a duration of the second measurement gap does not overlap with the duration of the first measurement gap.

In some optional implementations, the switching from the source BWP to the target BWP is triggered at a first time.

The second condition includes that: the first time is not within a duration of the first measurement gap and is within a duration of the second measurement gap, and the duration of the second measurement gap does not overlap with the duration of the first measurement gap.

In some optional implementations, the switching from the source BWP to the target BWP is triggered at a first time.

The second condition includes that: the first time is within a duration of the second measurement gap and within a duration of the first measurement gap.

In some optional implementations, the second condition includes: a priority of the first measurement gap configuration is higher than a priority of the second measurement gap configuration.

In some optional implementations, the second condition includes: the terminal device receives second indication information sent by the network device, and the second indication information is used for instructing the terminal device to, after determining that the switching from the source BWP to the target BWP is triggered, activate the second measurement gap configuration after waiting for the first duration.

In some optional implementations, the switching from the source BWP to the target BWP is triggered at a first time.

The second condition includes: the first time is within a duration of the second measurement gap, and the duration of the second measurement gap at least partially overlaps with the duration of the first measurement gap.

In some optional implementations, the first determining unit 901 is configured to determine based on a BWP switching command that the switching from the source BWP to the target BWP is triggered; or, determine based on a first timer that the switching from the source BWP to the target BWP is triggered.

In some optional implementations, the apparatus further includes a receiving unit (not illustrated in FIG. 9). The receiving unit is configured to receive first configuration information sent by the network device. The first configuration information includes at least one measurement gap configuration, and each of the at least one measurement gap configuration is associated with a measurement gap index.

In some optional implementations, the first configuration information is carried in RRC dedicated signaling.

In some optional implementations, the apparatus further includes a receiving unit. The receiving unit is configured receive second configuration information sent by the network device. The second configuration information includes at least one serving cell configuration, each of the at least one serving cell configuration includes at least one BWP configuration, and each of the at least one BWP configuration is associated with a measurement gap index.

In some optional implementations, the second configuration information is carried in RRC dedicated signaling.

It is to be understood by those skilled in the art that the description of the apparatus for determining a measurement gap described above in the embodiments of the present disclosure may be understood with reference to the description of the method for determining a measurement gap in the embodiments of the present disclosure.

Figure 10:
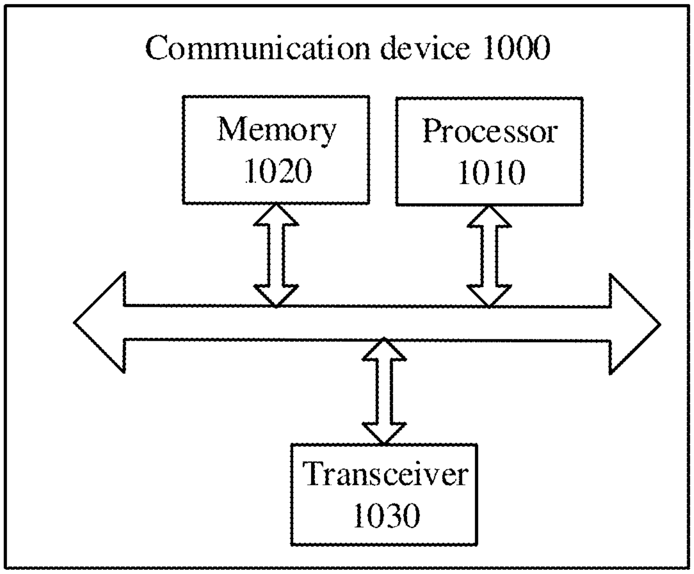
FIG. 10 is a schematic structural diagram of a communication device provided by an embodiment of the present disclosure.

FIG. 10 is a schematic structural diagram of a communication device 1000 provided by an embodiment of the present disclosure. The communication device may be the terminal device or the network device. The communication device 1000 illustrated in FIG. 10 includes a processor 1010. The processor 1010 may call a computer program from a memory and run the computer program to perform the method in the embodiments of the present disclosure.

In one example, as illustrated in FIG. 10, the communication device 1000 may also include a memory 1020. The processor 1010 may call a computer program from the memory 1020 and run the computer program to perform the method in the embodiments of the present disclosure.

The memory 1020 may be a separate device from the processor 1010, or may be integrated into the processor 1010.

In one example, as illustrated in FIG. 10, the communication device 1000 may also include a transceiver 1030. The processor 1010 may control the transceiver 1030 to communicate with another device, specifically, to transmit information or data to another device, or receive information or data from another device.

The transceiver 1030 may include a transmitter and a receiver. The transceiver 1030 may further include one or more antennas.

In one example, the communication device 1000 may specifically be the network device in the embodiments of the present disclosure. The communication device 1000 may implement a corresponding process implemented by the network device in each method of the embodiments of the present disclosure, which will not be elaborated herein for brief description.

In one example, the communication device 1000 may specifically be the mobile terminal/terminal device in the embodiments of the present disclosure. The communication device 1000 may implement a corresponding process implemented by the mobile terminal/terminal device in each method of the embodiments of the disclosure, which will not be elaborated herein for brief description.

Figure 11:
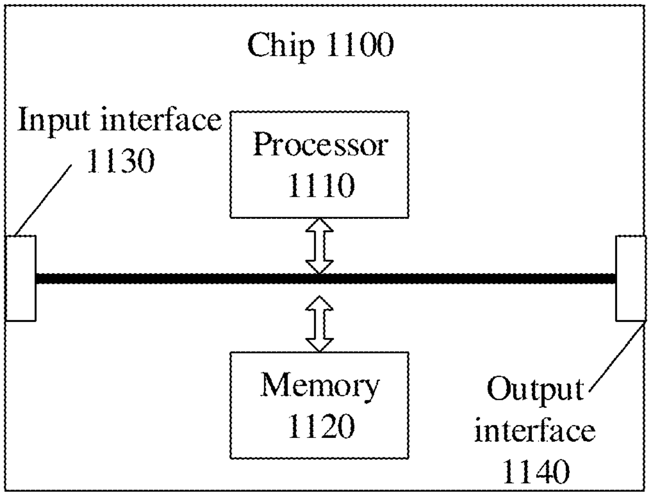
FIG. 11 is a schematic structural diagram of a chip provided by an embodiment of the present disclosure.

FIG. 11 is a schematic structural diagram of a chip according to an embodiment of the present disclosure. The chip 1100 illustrated in FIG. 11 includes a processor 1110. The processor 1110 can call a computer program from a memory and run the computer program to perform the method in the embodiments of the present disclosure.

In one example, as illustrated in FIG. 11, the chip 1100 may also include a memory 1120. The processor 1110 may call a computer program from the memory 1120 and run the computer program to perform the method in the embodiments of the present disclosure.

The memory 1120 may be a separate device from the processor 1110, or may be integrated in the processor 1110.

In one example, the chip 1100 may also include an input interface 1130. The processor 1110 may control the input interface 1130 to communicate with another device or chip, and specifically, may acquire information or data transmitted by another device or chip.

In one example, the chip 1100 may also include an output interface 1140. The processor 1110 may control the output interface 1140 to communicate with another device or chip, and specifically, may output information or data to another device or chip.

In one example, the chip may be applied to the network device in the embodiments of the present disclosure. The chip may implement a corresponding process implemented by the network device in each method of the embodiments of the disclosure, which will not be elaborated herein for brief description.

In one example, the chip may be applied to the mobile terminal/terminal device in the embodiments of the present disclosure. The chip may implement a corresponding process implemented by the mobile terminal/terminal device in each method of the embodiments of the disclosure, which will not be elaborated herein for brief description.

It is to be understood that in the embodiments of the disclosure, the chip may also be referred to as a system level chip, a system chip, a chip system or a system-on-chip.

Figure 12:
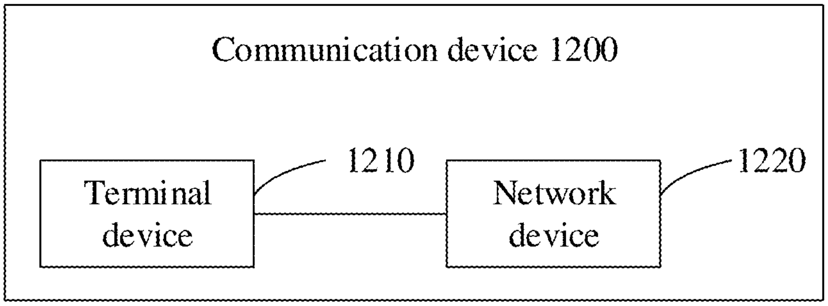
FIG. 12 is a schematic block diagram of a communication system provided by an embodiment of the present disclosure.

FIG. 12 is a schematic block diagram of a communication system 1200 provided by an embodiment of the present disclosure. As illustrated in FIG. 12, the communication system 1200 includes a terminal device 1210 and a network device 1220.

The terminal device 1210 may implement the corresponding functions implemented by the terminal device in the above methods, and the network device 1220 may implement the corresponding functions implemented by the network device in the above methods. Details will not be elaborated herein for brief description.

It is to be understood that in the embodiments of the disclosure, the processor may be an integrated circuit chip with a signal processing capability. In an implementation process, each operation of the method embodiments may be completed by an integrated logical circuit of hardware in the processor or instructions in a software form. The processor may be a universal processor, a Digital Signal Processor (DSP), an Application Specific Integrated Circuit (ASIC), a Field Programmable Gate Array (FPGA) or another programmable logical device, discrete gate or transistor logical device and discrete hardware component. Each method, step and logical block diagram disclosed in the embodiments of the disclosure may be implemented or executed. The universal processor may be a microprocessor or the processor may also be any related processor and the like. The operations of the methods disclosed in combination with the embodiments of the disclosure may be directly embodied to be executed and completed by a hardware decoding processor, or executed and completed by a combination of hardware and software modules in the decoding processor. The software module may be located in a mature storage medium in the art, such as a Random Access Memory (RAM), a flash memory, a Read-Only Memory (ROM), a Programmable ROM (PROM), an Electrically Erasable PROM (EEPROM) or a register. The storage medium is located in the memory. The processor reads information in the memory, and completes the operations of the above methods in combination with hardware of the processor.

It is to be understood that the memory in the embodiment of the disclosure may be a volatile memory or a non-volatile memory, or may include the volatile memory and the non-volatile memory. The non-volatile memory may be an ROM, a PROM, an Erasable PROM (EPROM), an EEPROM or a flash memory. The volatile memory may be an RAM and is used as an external high-speed cache. It is exemplarily but unlimitedly described that RAMs in various forms may be adopted, such as a Static RAM (SRAM), a Dynamic RAM (DRAM), a Synchronous DRAM (SDRAM), a Double Data Rate SDRAM (DDR SDRAM), an Enhanced SDRAM (ESDRAM), a Synchlink DRAM (SLDRAM) and a Direct Rambus RAM (DR RAM). It is to be noted that the memory of the system and the method described in the disclosure is intended to include but not limited to memories of these and any other suitable type.

It is to be understood that the above memory is exemplarily but unlimitedly described. For example, the memory in the embodiments of the disclosure may also be an SRAM, a DRAM, an SDRAM, a DDR SDRAM, an ESDRAM, an SLDRAM and a DR RAM. That is, the memory in the embodiments of the disclosure is intended to include but not limited to memories of these and any other suitable type.

The embodiments of the disclosure also provide a computer-readable storage medium for storing one or more computer programs.

In one example, the computer-readable storage medium may be applied in the network device of the embodiments of the disclosure. The computer programs may enable a computer to perform the corresponding process implemented by the network device in each method of the embodiments of the disclosure, which will not be elaborated herein for brief description.

In one example, the computer-readable storage medium may be applied in the mobile terminal/terminal device of the embodiments of the disclosure. The computer programs may enable a computer to perform the corresponding process implemented by the mobile terminal/terminal device in each method of the embodiments of the disclosure, which will not be elaborated herein for brief description.

The embodiments of the disclosure also provide a computer program product. The computer program product includes one or more computer program instructions.

In one embodiment, the computer program product may be applied in the network device of the embodiments of the disclosure. The computer program instructions may enable a computer to perform the corresponding process implemented by the network device in each method of the embodiments of the disclosure, which will not be elaborated herein for brief description.

In one example, the computer program product may be applied in the mobile terminal/terminal device of the embodiments of the disclosure. The computer program instructions may enable a computer to perform the corresponding process implemented by the mobile terminal/terminal device in each method of the embodiments of the disclosure, which will not be elaborated herein for brief description.

The embodiments of the disclosure also provide a computer program.

In one embodiment, the computer program may be applied in the network device of the embodiments of the disclosure. The computer program, when executed by a computer, enables the computer to perform the corresponding process implemented by the network device in each method of the embodiments of the disclosure, which will not be elaborated herein for brief description.

In one example, the computer program may be applied in the mobile terminal/terminal device of the embodiments of the disclosure. The computer program, when executed by a computer, enables the computer to perform the corresponding process implemented by the mobile terminal/terminal device in each method of the embodiments of the disclosure, which will not be elaborated herein for brief description.

Those of ordinary skill in the art may realize that the units and algorithm operations of each example described in combination with the embodiments disclosed in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the disclosure.

Those skilled in the art may clearly learn about that specific working processes of the system, device and unit described above may refer to the corresponding processes in the method embodiments and will not be elaborated herein for convenient and brief description.

In some embodiments provided by the disclosure, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each functional unit in each embodiment of the disclosure may be integrated into a processing unit, each unit may also physically exist independently, and two or more than two units may also be integrated into a unit.

When being realized in form of software functional unit and sold or used as an independent product, the function may also be stored in a computer-readable storage medium. Based on such an understanding, the technical solutions of the disclosure substantially or parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the operations of the method in each embodiment of the disclosure. The abovementioned storage medium includes: various media capable of storing program codes such as a U disk, a mobile hard disk, a ROM, a RAM, a magnetic disk or an optical disk.

The above is only the specific implementation mode of the disclosure and not intended to limit the scope of protection of the disclosure. Any variations or replacements apparent to those skilled in the art within the technical scope disclosed by the disclosure shall fall within the scope of protection of the disclosure. Therefore, the scope of protection of the disclosure shall be subject to the scope of protection of the claims.

What is claimed is:

1. A method for determining a measurement gap, comprising:

determining, by a terminal device, that switching from a source bandwidth part (BWP) to a target BWP is triggered at a first time, switching of the source BWP being associated with a first measurement gap configuration, and the target BWP being associated with a second measurement gap configuration; and continuing to use, by the terminal device when a condition is met, the first measurement gap configuration after the first time until a duration of the first measurement gap ends, activating or enabling the second measurement gap configuration, and performing measurement using the second measurement gap configuration;

wherein the condition comprises one of the following:

the first time is within the duration of the second measurement gap and within the duration of the first measurement gap;

a priority of the first measurement gap configuration is higher than a priority of the second measurement gap configuration; or the first time is within the duration of the second measurement gap, and the duration of the second measurement gap at least partially overlaps with the duration of the first measurement gap.

2. The method of claim 1, wherein the first condition further comprises that the first time is not within a duration of the first measurement gap and is within a duration of the second measurement gap.

3. The method of claim 1, wherein determining, by the terminal device, that the switching from the source BWP to the target BWP is triggered comprises:

determining, by the terminal device based on a BWP switching command, that the switching from the source BWP to the target BWP is triggered; or determining, by the terminal device based on a first timer, that the switching from the source BWP to the target BWP is triggered.

4. The method of claim 1, further comprising:

receiving, by the terminal device, first configuration information sent by a network device, the first configuration information comprising at least one measurement gap configuration, and each of the at least one measurement gap configuration being associated with a measurement gap index.

5. The method of claim 4, wherein the first configuration information is carried in radio resource control (RRC) dedicated signaling.

6. The method of claim 1, further comprising:

receiving, by the terminal device, second configuration information sent by a network device, the second configuration information comprising at least one serving cell configuration, each of the at least one serving cell configuration comprising at least one BWP configuration, and each of the at least one BWP configuration being associated with a measurement gap index.

7. The method of claim 6, wherein the second configuration information is carried in RRC dedicated signaling.

8. An apparatus for determining a measurement gap, applicable to a terminal device, the apparatus comprising a processor, configured to:

determine that switching from a source bandwidth part (BWP) to a target BWP is triggered at a first time, switching of the source BWP being associated with a first measurement gap configuration, and the target BWP being associated with a second measurement gap configuration;

continue to use, when a condition is met, the first measurement gap configuration after the first time until a duration of the first measurement gap ends, and activate or enable the second measurement gap configuration; and perform measurement using the second measurement gap configuration;

wherein the condition comprises one of the following:

the first time is within the duration of the second measurement gap and within the duration of the first measurement gap;

a priority of the first measurement gap configuration is higher than a priority of the second measurement gap configuration; or the first time is within the duration of the second measurement gap, and the duration of the second measurement gap at least partially overlaps with the duration of the first measurement gap.

9. The apparatus of claim 8, wherein the processor is configured to: determine based on a BWP switching command that the switching from the source BWP to the target BWP is triggered, or determine based on a first timer that the switching from the source BWP to the target BWP is triggered.

10. The apparatus of claim 8, further comprising:

a transceiver, configured to receive first configuration information sent by a network device, the first configuration information comprising at least one measurement gap configuration, and each of the at least one measurement gap configuration being associated with a measurement gap index.

11. The apparatus of claim 10, wherein the first configuration information is carried in radio resource control (RRC) dedicated signaling.

12. The apparatus of claim 8, further comprising:

a transceiver, configured to receive second configuration information sent by a network device, the second configuration information comprising at least one serving cell configuration, each of the at least one serving cell configuration comprising at least one BWP configuration, and each of the at least one BWP configuration being associated with a measurement gap index.

13. The apparatus of claim 12, wherein the second configuration information is carried in RRC dedicated signaling.

14. A non-transitory computer-readable storage medium, configured to store a computer program that enables a computer to perform a method for determining a measurement gap, comprising:

determining that switching from a source bandwidth part (BWP) to a target BWP is triggered at a first time, switching of the source BWP being associated with a first measurement gap configuration, and the target BWP being associated with a second measurement gap configuration; and continuing to use, by the terminal device when a condition is met, the first measurement gap configuration after the first time until a duration of the first measurement gap ends, activating or enabling the second measurement gap configuration, and performing measurement using the second measurement gap configuration;

wherein the condition comprises one of the following:

the first time is within the duration of the second measurement gap and within the duration of the first measurement gap;

a priority of the first measurement gap configuration is higher than a priority of the second measurement gap configuration; or the first time is within the duration of the second measurement gap, and the duration of the second measurement gap at least partially overlaps with the duration of the first measurement gap.

* * * * *